United States Patent
Ding et al.

(10) Patent No.: US 10,248,870 B2
(45) Date of Patent: Apr. 2, 2019

(54) TRAFFIC-COUNTING SYSTEM AND METHOD THEREOF

(71) Applicant: Xiaoyi Technology Co., Ltd., Shanghai (CN)

(72) Inventors: Dajun Ding, Shanghai (CN); Lili Zhao, Shanghai (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 223 days.

(21) Appl. No.: 15/205,236

(22) Filed: Jul. 8, 2016

(65) Prior Publication Data

US 2018/0005048 A1 Jan. 4, 2018

(30) Foreign Application Priority Data

Jun. 29, 2016 (CN) .......................... 2016 1 0496591

(51) Int. Cl.
| | | |
|---|---|---|
| *G06K 9/00* | (2006.01) | |
| *G06K 9/46* | (2006.01) | |
| *G06T 7/00* | (2017.01) | |
| *G06T 7/20* | (2017.01) | |

(52) U.S. Cl.
CPC ..... *G06K 9/00785* (2013.01); *G06K 9/00335* (2013.01); *G06K 9/4652* (2013.01); *G06K 9/4661* (2013.01); *G06K 9/4671* (2013.01); *G06T 7/0079* (2013.01); *G06T 7/2033* (2013.01); *G06K 2009/4666* (2013.01); *G06T 2207/20144* (2013.01); *G06T 2207/30242* (2013.01)

(58) Field of Classification Search
CPC .......... G06K 9/00778; G06K 9/00791; G06K 9/00785
See application file for complete search history.

(56) References Cited

U.S. PATENT DOCUMENTS

| | | | | | |
|---|---|---|---|---|---|
| 5,574,762 | A * | 11/1996 | Sato | ................... | G06K 9/00778 377/10 |
| 5,973,732 | A * | 10/1999 | Guthrie | .............. | G06K 9/00778 348/150 |
| 9,418,300 | B2 * | 8/2016 | Ebling | ................ | G06K 9/00778 |
| 9,449,506 | B1 * | 9/2016 | Whiting | .............. | G06K 9/00369 |
| 9,460,613 | B1 * | 10/2016 | Whiting | ................. | G08G 1/005 |
| 9,607,402 | B1 * | 3/2017 | Whiting | ................. | G08G 1/166 |
| 9,857,196 | B2 * | 1/2018 | Gotoh | ..................... | G01C 21/34 |
| 9,865,163 | B2 * | 1/2018 | Gotoh | ..................... | H04L 67/12 |
| 9,875,247 | B2 * | 1/2018 | Gotoh | ..................... | G01C 21/32 |
| 9,904,938 | B2 * | 2/2018 | Hawkins | ............ | G01C 21/3629 |
| 2008/0285886 | A1 * | 11/2008 | Allen | ................. | G06F 17/30241 382/284 |

(Continued)

*Primary Examiner* — Bobbak Safaipour
(74) *Attorney, Agent, or Firm* — Finnegan, Henderson, Farabow, Garrett & Dunner, LLP

(57) ABSTRACT

Traffic-counting methods and apparatus are disclosed. The methods may include, in a view of traffic comprising moving objects, identifying first and second regions of interest (ROIs). The methods may also include obtaining first and second image data respectively representing the first and second ROIs. The methods may also include analyzing the first and second image data over time. The methods may further include, based on the analyses of the first and second image data, counting the moving objects and determining moving directions of the moving objects.

25 Claims, 11 Drawing Sheets

(56) References Cited

U.S. PATENT DOCUMENTS

| | | | |
|---|---|---|---|
| 2013/0336581 A1* | 12/2013 | Datta | G06K 9/00785 |
| | | | 382/165 |
| 2014/0132758 A1 | 5/2014 | Saptharishi | H04N 7/18 |
| | | | 348/135 |
| 2015/0221094 A1* | 8/2015 | Marcheselli | G06K 9/00335 |
| | | | 382/103 |
| 2015/0221096 A1* | 8/2015 | Gefen | G06T 7/292 |
| | | | 382/103 |
| 2015/0294183 A1* | 10/2015 | Watanabe | G06K 9/00771 |
| | | | 382/203 |
| 2017/0032402 A1* | 2/2017 | Patsiokas | G06Q 30/0266 |
| 2017/0032669 A1* | 2/2017 | Wu | G08G 1/0116 |
| 2017/0187963 A1* | 6/2017 | Lee | G06F 3/013 |
| 2017/0193312 A1* | 7/2017 | Ai | G06K 9/66 |
| 2017/0206669 A1* | 7/2017 | Saleemi | G06T 7/292 |
| 2017/0353830 A1* | 12/2017 | Colonna | H04W 4/029 |
| 2018/0005033 A1* | 1/2018 | Ding | G06K 9/00624 |
| 2018/0005384 A1* | 1/2018 | Ding | G06T 7/215 |
| 2018/0061243 A1* | 3/2018 | Shloosh | G08G 5/0013 |

* cited by examiner

Fig. 7

| | $a_m$ | $b_m$ | $c_m$ | . | . |
|---|---|---|---|---|---|
| 730 | 193 | 159 | 189 | 140 | 160 |

| | $a_3$ | $b_3$ | $c_3$ | . | . |
|---|---|---|---|---|---|
| 723 | 193 | 159 | 192 | 140 | 165 |

| | $a_2$ | $b_2$ | $c_2$ | . | . |
|---|---|---|---|---|---|
| 722 | 194 | 162 | 189 | 140 | 160 |

| | $a_1$ | $b_1$ | $c_1$ | . | . |
|---|---|---|---|---|---|
| 721 | 191 | 152 | 183 | 140 | 132 |

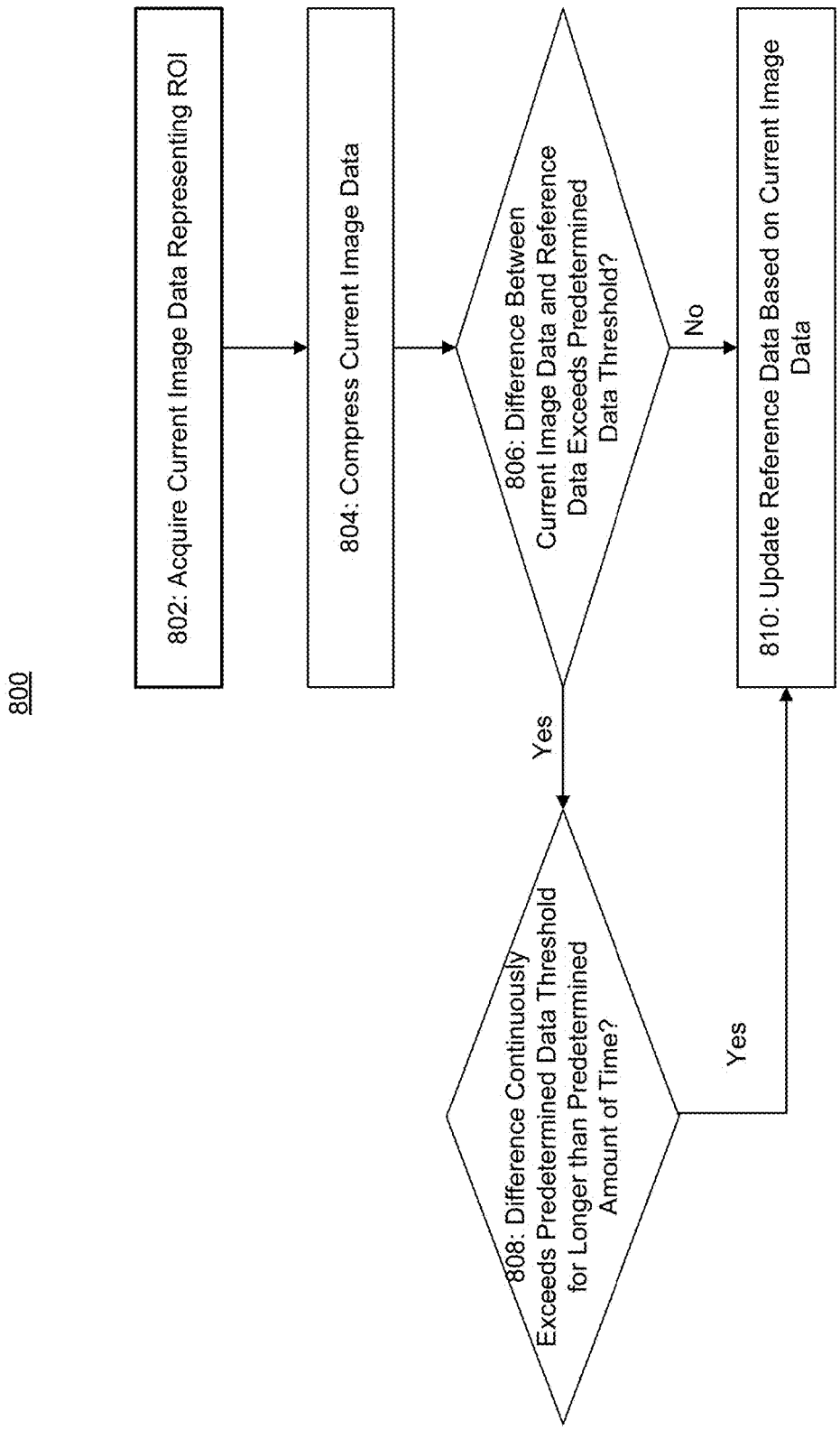

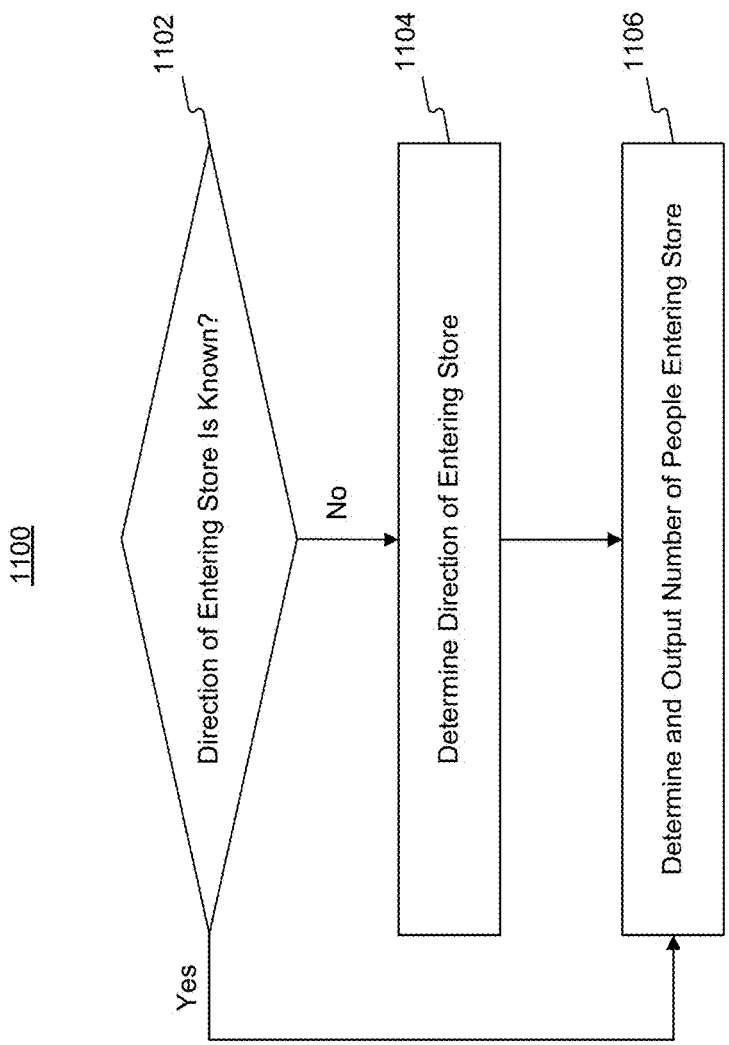

TRAFFIC-COUNTING SYSTEM AND METHOD THEREOF

CROSS-REFERENCE TO RELATED APPLICATION

This application is based upon and claims priority from Chinese Patent Application No. 201610496591.5, filed on Jun. 29, 2016, the disclosure of which is expressly incorporated herein by reference in its entirety.

TECHNICAL FIELD

The present disclosure generally relates to computer vision technology, and more specifically to a traffic-counting system and method.

BACKGROUND

Traffic counting refers to counting the number of movable objects moving in certain directions in a given period of time. For example, the objects may be people or vehicles. Traffic counting has various applications, such as determining the number of people moving into and/or out of a building, the number of passengers entering and/or existing a bus or train, the number of vehicles moving into and/or out of a parking lot, the number of pedestrians/vehicles moving in a given direction, etc.

In recent years, traffic counting has gained tremendous attention in many industry and service sectors. For example, consumer businesses (e.g., retail stores, supermarkets, etc.) are becoming increasingly aware of the importance of monitoring the number of visitor to their establishments. Customer traffic data may be analyzed to better organize staff shifts, manage inventory, evaluate sales performance, conduct marketing research, etc. The trend for improved insights to patronage can also be seen at other locations, such as, exhibition halls, sports and gym facilities, and public institutions such as libraries, universities, and hospitals.

Also for example, traffic counting may be used for security or safety reasons. In the case of an evacuation, it is essential to know how many people are inside a building at any given time. A fire department, for instance, needs the traffic data to understand the activities in a building and manage fire exits of the building, e.g., adding or removing fire exits, altering the size of the fire exits, etc.

For yet another example, in the current efforts to build "smart cities," decision makers are increasingly relying on the traffic counting data to make informed decisions on regulating public transportation, distributing public resources, etc.

Conventionally, traffic counting is manually performed by human workers. However, humans are error prone, tire easily, and cannot uninterruptedly monitor the traffic. For example, a human worker may miscount in a crowded place. Moreover, human labor is expensive and thus the traffic counting usually has to be performed in an ad hoc manner. The data range may only cover a short time span such as several hours or several days, and cannot offer insights into the long-term trend of the traffic. Therefore, the manually obtained data are usually lack of accuracy and comprehensiveness. Devices and methods are needed for automatically performing traffic counting.

The disclosed methods and systems address one or more of the problems listed above.

SUMMARY

Consistent with one embodiment of the present disclosure, a traffic-counting method is provided. The method may include, in a view of traffic comprising moving objects, identifying first and second regions of interest (ROIs). The method may also include obtaining first and second image data respectively representing the first and second ROIs. The method may also include analyzing the first and second image data over time. The method may further include, based on the analyses of the first and second image data, counting the moving objects and determining moving directions of the moving objects.

Consistent with another embodiment of the present disclosure, a traffic-counting device is provided. The device may include a memory and a processor. The memory may store instructions. The processor may be configured to execute the instructions to, in a view of traffic comprising moving objects, identify first and second regions of interest (ROIs); obtain first and second image data respectively representing the first and second ROIs; analyze the first and second image data over time; and, based on the analyses of the first and second image data, count the moving objects and determine moving directions of the moving objects.

Consistent with yet another embodiment of the present disclosure, a non-transitory computer-readable storage medium storing instructions for performing a traffic-counting method is provided. The instructions cause a processor to perform a traffic-counting method. The method may include, in a view of traffic comprising moving objects, identifying first and second regions of interest (ROIs). The method may also include obtaining first and second image data respectively representing the first and second ROIs. The method may also include analyzing the first and second image data over time. The method may further include, based on the analyses of the first and second image data, counting the moving objects and determining moving directions of the moving objects.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

FIG. 7 is a schematic diagram illustrating a process for applying a median filter to image data representing an ROI, according to an exemplary embodiment.

FIG. 8 is a flowchart of a method for updating a background of an ROI, according to an exemplary embodiment.

FIG. 9A is a schematic diagram illustrating a process for detecting a foreground in an ROI, according to an exemplary embodiment.

FIG. 9B is a schematic diagram illustrating a process for detecting a foreground in an ROI, according to an exemplary embodiment.

FIG. 11 is a flowchart of a method for identifying a moving direction toward a place of interest, according to an exemplary embodiment

DETAILED DESCRIPTION

Figure 1:
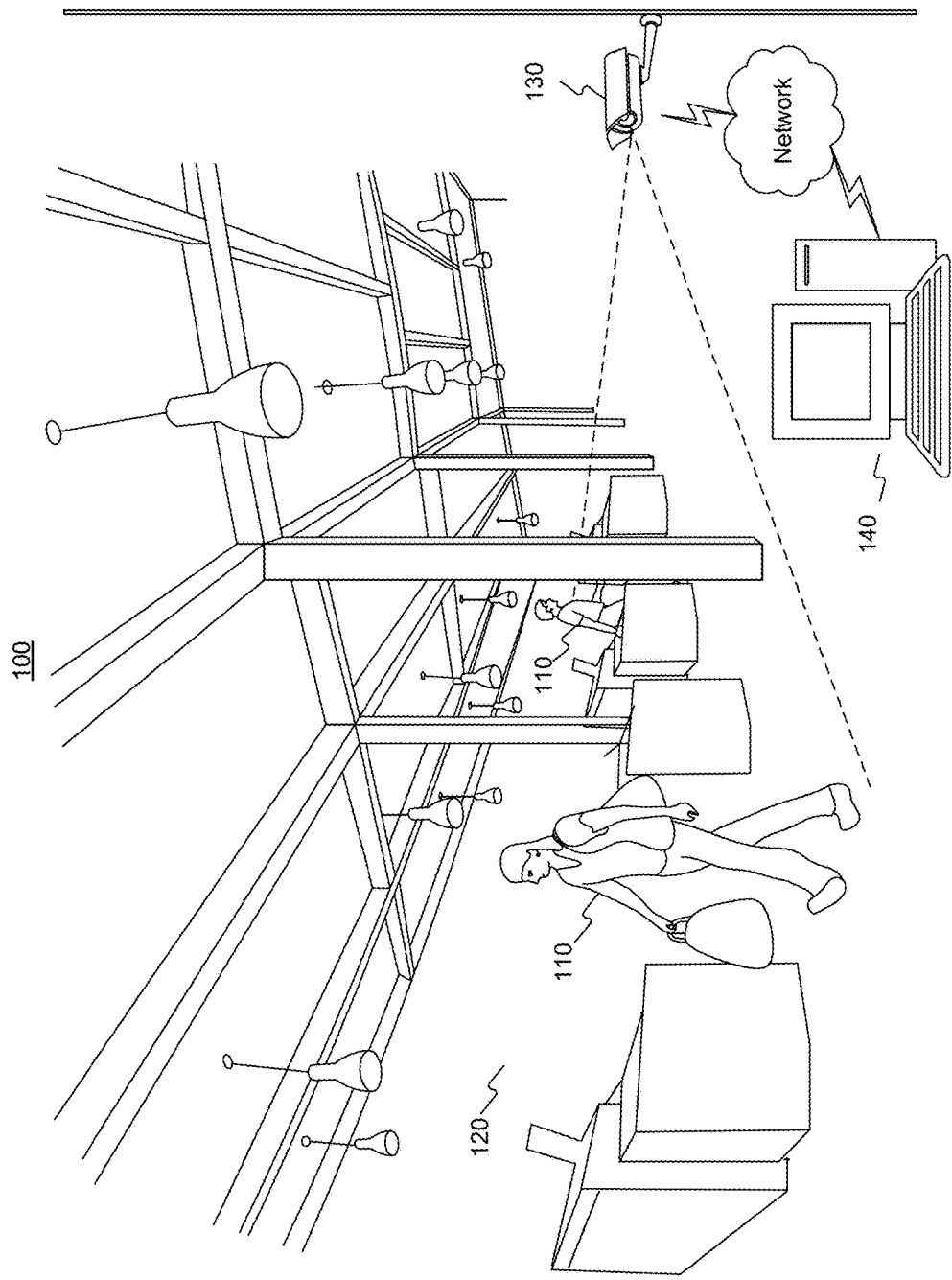
FIG. 1 is a schematic diagram illustrating an implementation environment for performing traffic counting, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise noted. The implementations set forth in the following description of exemplary embodiments do not represent all implementations consistent with the invention. Instead, they are merely examples of devices and methods consistent with aspects related to the invention as recited in the appended claims.

In the present disclosure, "traffic counting" refers to counting moving objects in a given period of time. The disclosed traffic-counting system may determine not only the number of moving objects, but also the moving directions of the moving objects. For example, the traffic-counting system may be installed at the entrance of a shopping mall to monitor how many customers are entering and leaving the mall. For another example, the traffic-counting system may be installed at the gate of a parking lot to monitor how many vehicles are moving into or out of the parking lot. For yet another example, the traffic-counting system may be used at an intersection to determine the numbers of vehicles/pedestrians crossing the intersection and the moving directions of the vehicles/pedestrians.

Various methods may be developed to count the traffic. One method is to use light sensors to count the number of moving objects based on transmission and/or reflection of light. For example, a light-emitting diode (LED) may be mounted on one side of a door and emit an infrared light beam toward the other side of the door. A light detector may be used to detect the infrared light. When people pass the door and cut the infrared light beam, the light detector may detect changes in the intensity of the infrared light beam. A controller may be used to analyze the changes of light intensity and determine the number of people passing the door.

This method may be applied to other types of light, such as laser beams at various wavelengths. The light sensor-based systems are inexpensive and easy to be installed. Moreover, the light generators and detectors have compact sizes and thus are suitable to be installed at many places. However, the light-sensor based method has several drawbacks that affect the accuracy of its counting result. First, this method is sensitive to the environment change and cannot determine whether the change of light intensity is caused by a moving person or change in the environment, such as falling dust. Second, this method cannot differentiate the types of the detected moving objects, such as distinguishing humans from pets. Third, when a group of people are passing the door at the same time, this method may erroneously treat multiple people as one person. Moreover, this method requires multiple light sensors/detectors and complicated data analysis to discern the moving directions of the objects. For example, at least two light beams are needed to deduce whether a person is entering or leaving a place.

Another traffic-counting method is to use turnstiles, such as tripod turnstiles, at an entrance/exit. Turnstiles can accurately count people and determine the moving directions of the people. However, turnstiles obstruct people's movement and slow down the traffic. Turnstiles also reduce people's "feeling of freedom." Therefore, turnstiles may not be desirable for commercial places like shopping malls.

Yet another traffic-counting method is to use weight sensors, such as foot step sensors, at an entrance/exit. When a person steps on a weight sensor, the sensor performs the counting. However, weight sensors require heavy modification of the environment, e.g., opening the floor, and thus are costly to install and repair. Moreover, weight sensors cannot easily determine the directionality of objects.

The present disclosure provides a computer vision-based system and method for traffic counting, as an alternative to the above-described methods. In particular, the disclosed embodiments employ video cameras to detect objects (e.g., humans) entering or leaving a predetermined area. As described below, the disclosed embodiments provide a technical solution to address one or more of the above-identified difficulties.

FIG. 1 is a schematic diagram illustrating an implementation environment 100 for performing traffic counting, according to an exemplary embodiment. Referring to FIG. 1, implementation environment 100 may include one or more objects 110, a movement area 120, an imaging device 130, and a back-end computer 140.

Objects 110 may be any objects, people, machines, devices, or systems that can move and/or stop. When objects 110 are moving, they form traffic that can be monitored by imaging device 130.

Movement area 120 may be any area in which objects 110 can move. For example, movement area 120 may be an entrance, an exit, a door or gate, a corridor, a street, a playground, the space inside a room, etc.

For illustrative purpose only, objects 110 are shown and described herein as people entering and leaving a store, and movement area 120 is shown and described herein as the entrance/exit (e.g., checkout area) of the store. However, it is understood that the disclosed embodiments can be applied to any other types of moving objects, such as animals, terrestrial or aerial vehicles, trains, marine vessels, etc. It is also understood that the disclosed embodiments can be applied to any moving areas where object traffic may occur, such as an elevator entrance, a street intersection, the doors of a subway train, etc.

Generally, objects 110 may move in any direction. For example, movement area 120 may be a playground on which people may run or walk in any direction. However, in practice, the traffic may have certain main directions. For example, as illustrated in FIG. 1, in the store's entrance, customers either move into or out of the store. For another example, in a corridor of a building, people generally move in only two directions. For another example, the traffic occurring at a door generally has only two directions, i.e., either entering or leaving a room/building. For yet another example, the traffic on a road generally moves in directions defined by the road.

Imaging device 130 may be configured to capture data representing images of moving objects 110. As used herein, an "image" can refer to, in part or in whole, a static or dynamic visual representation including, but not limited to, a photo, a picture, a graphic, a video, a hologram, a virtual reality image, an augmented reality image, other visual representations, or combinations thereof. In some embodiments, multiple imaging devices 130 may be used to capture image data of different parts of the traffic formed by objects 130.

For example, imaging device 130 may include photographic cameras, video cameras, infrared imaging devices, ultraviolet imaging devices, ultrasonic imaging devices, radar devices, etc. For illustrative purpose only, imaging device 130 is shown and described herein as a video camera capable of capturing frames of image data with various resolutions and frame rates.

In one embodiment, imaging device 130 is configured as an overhead camera, e.g., a camera attached to a ceiling or the upper frame of a door, to avoid problems of image occlusion caused by multiple objects 110 and variation of background light. However, overhead cameras may only capture the heads and/or shoulders of people, which often do not convey much information about the people's identities and behaviors.

As described below in more detail, imaging device 130 in the present disclosure is not limited to overhead imaging devices. In some embodiments, imaging device 130 may be installed at a height comparable to the average height of objects 110, such as humans. For example, as illustrated in FIG. 1, imaging device 130 may be attached to a wall of the store, at a distance of, e.g., 1.5 meters, above the floor. This way, the images captured by imaging devices 130 may cover the full bodies of the customers, and thus may be used to not only count the traffic but also fulfill other monitoring purposes. For example, the images may show facial features of the customers, thus enabling identification of the customers. Accordingly, the same equipment and infrastructure may be used for surveillance as well as for traffic counting. This way, the user's expenses can be reduced.

As described before, the traffic formed by objects 110 may move in primary directions. If the imaging direction of imaging device 130 is parallel to or forms a small angle (e.g., 10 degrees) with the traffic direction, objects 110 are moving toward or away from imaging device 130 during majority of the time. In this situation, the images obtained by imaging device 130 must be analyzed for depth information of objects 110, in order to detect motion of objects 110. Moreover, the problem of occlusion caused by multiple objects 110 may be severe and affect the accuracy of traffic counting.

Figure 2:
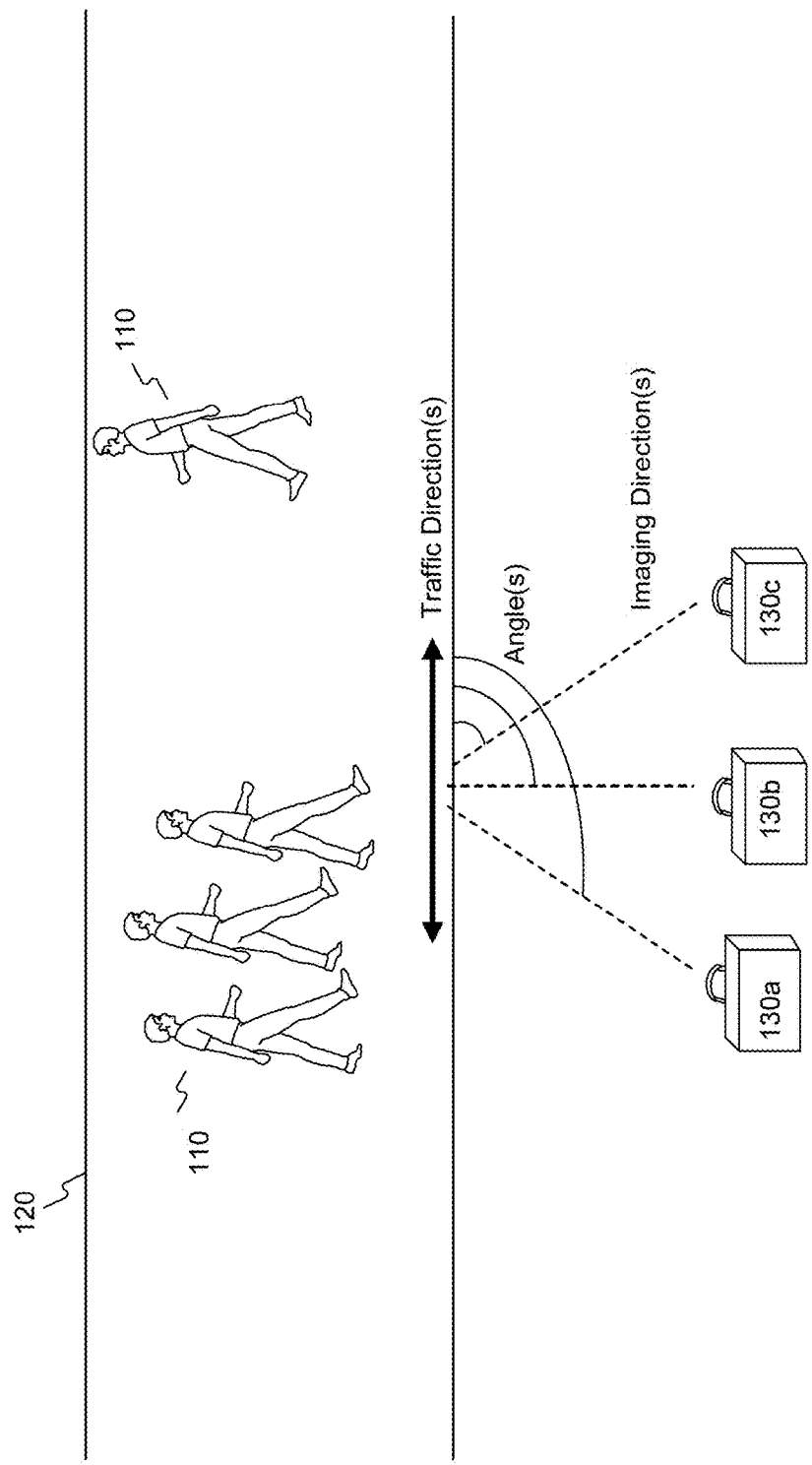
FIG. 2 is a schematic diagram illustrating a relative configuration between an imaging device and traffic directions, according to an exemplary embodiment.

To avoid these problems, in some embodiments, the imaging direction of imaging device 130 may be set to form a large angle with the traffic direction, e.g., 80 or 90 degrees. FIG. 2 is a schematic diagram illustrating a relative configuration between imaging device 130 and traffic directions, according to an exemplary embodiment. Referring to FIG. 2, multiple objects 110 (e.g., people) are moving along movement area 120 (e.g., a sidewalk or corridor). The traffic formed by objects 110 has discernable directions, defined by the physical shape of movement area 120. Imaging device 130 may be oriented such that the image direction intersects with the traffic directions at a large angle. For example, as illustrated in FIG. 2, the imaging directions of imaging devices 130a-c may each form a predetermined large angle with the traffic directions. This way, motions of objects 110 may be determined based on the position changes of objects 110 in the captured images, without the need of depth information. Moreover, the occlusion problem may be reduced.

In some embodiments, imaging device 130 may include an embedded traffic-counting module (not shown in FIG. 1) configured to perform the disclosed traffic-counting methods. The embedded traffic-counting module may limit the amount of image data that must be transmitted to a separate device, e.g., back-end computer 140, for image analysis. For example, if imaging device 130 is a video camera capable of acquiring videos in RGB-24 format at 320×240 pixels, each video image may be coded in 3×320×240=230400 bytes=225 KB. Further, if this video camera operates at 15 frames per second (fps), one second of video data equals about 3.3 MB. That is, at least 3.3 MB/s bandwidth is needed to transmit the image data. This may create a heavy burden on the user's network, particularly if multiple imaging devices 130 are used.

With the embedded traffic-counting module, imaging device 130 may perform the traffic counting within the device, and then send the counting result to other devices for further analysis. This avoids the need of exporting all the image data, thus easing the burden on the network. This also means less equipment, wiring, and expense for the user. For the above reasons, imaging devices with embedded traffic-counting functionality are particularly suitable for commercial places such as supermarkets, retail stores, etc.

Referring once more to FIG. 1, back-end computer 140 is a computer separate from imaging device 130 and may be connected to imaging device 130 through a wired or wireless network. Back-end computer 140 may receive the traffic-counting result from imaging device 130. The traffic-counting result, for example may include the number of people entering and exiting a store in a given period of time. Back-end computer 140 may analyze the traffic-counting result, together with other relevant data, to generate various reports to meet the user's specific needs. For example, the store manager may use back-end computer 140 to determine the trend of customer traffic over a day, a week, a month, a shopping season, a year, an economic cycle, etc. Based on the determination, back-end computer 140 may generate recommendations for the store owner to increase staffing during peak hours, reduce staffing during slow time, manage inventory over time, etc. Thus, intelligent management of the store may be achieved.

In some embodiments, imaging device 130 may generate the traffic-counting result and send it to back-end computer 140 in real time. This way, back-end computer 140 may constantly monitor the traffic and detect any unexpected changes in a timely manner. For example, when an unexpected surge of customers is detected, back-end computer 140 may immediately alert the store owner to take a swift response.

In some embodiments, imaging device 130 may also transmit the image data to back-end computer 140 for performing the disclosed traffic-counting methods. The present disclosure does not limit the type of devices used to perform the disclosed traffic-counting methods.

Figure 3:
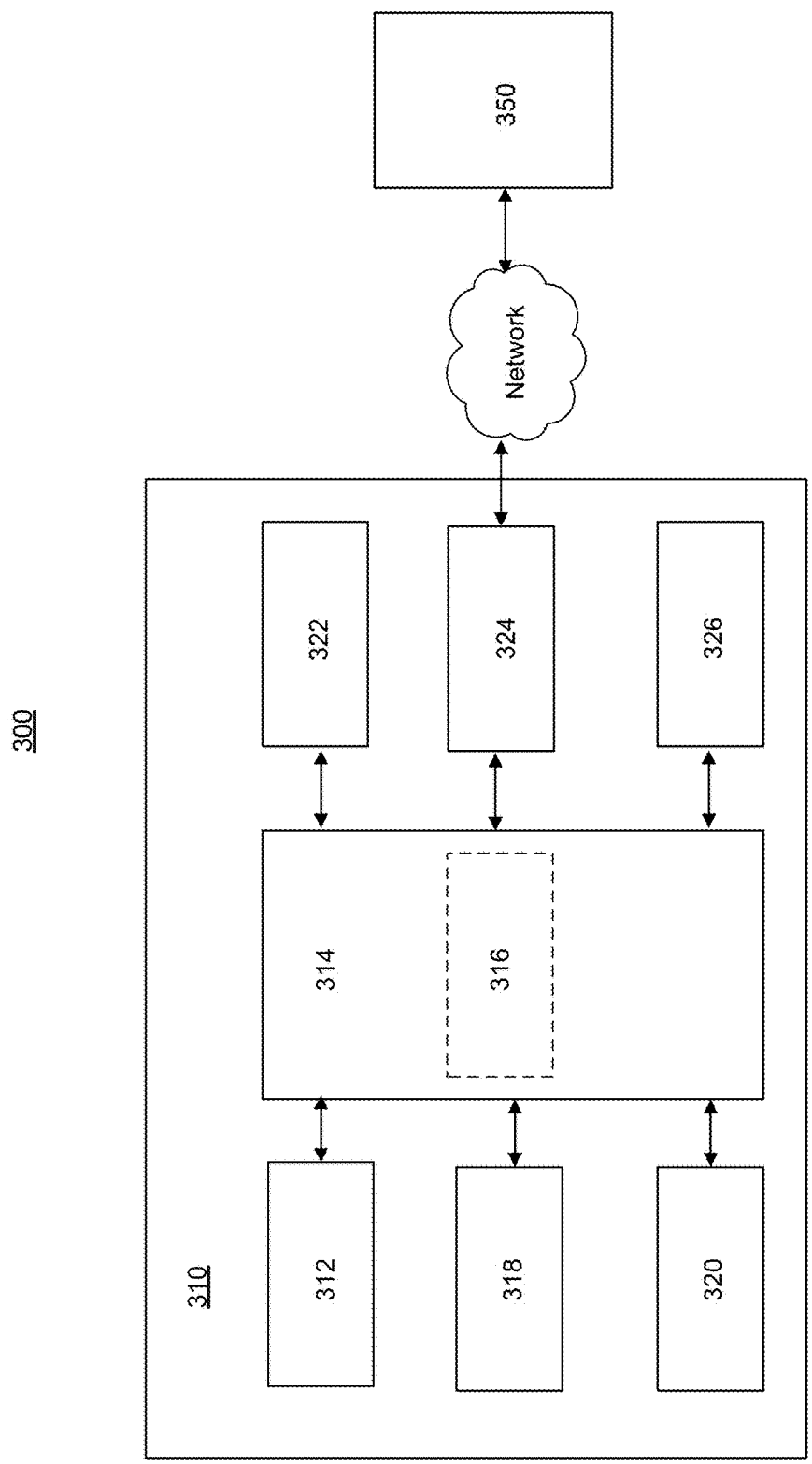
FIG. 3 is a block diagram of a traffic-counting system, according to an exemplary embodiment.

FIG. 3 is a block diagram of a traffic-counting system 300, according to an exemplary embodiment. Referring to FIG. 3, system 300 may include an imaging device 310 and a server 350, connected to each other through a wired or wireless network.

Imaging device 310 may include one or more of the following components: an image sensor 312, a processing component 314, a memory 318, a power component 320, a multimedia component 322, a communication component 324, and an input/output (I/O) interface 326.

Image sensor 312 may be a charge-coupled device (CCD) sensor, a complementary metal-oxide-semiconductor (CMOS) sensor, or other type of solid-state sensor. Image sensor 312 may also include any of optical devices, lens, CCD or CMOS driving circuitry, and other arrangements of optical components, electronic components, and control circuitry used in transmitting and receiving light of various wavelengths.

Processing component 314 may be configured to control overall operations of imaging device 310, such as the operations associated with pan-tilt-zoom movements, shutter control, video recording, video encoding, image display, and data communications. Processing component 314 may include one or more processors 316 to execute instructions to perform some or all the steps in the disclosed traffic-counting methods. Moreover, processing component 314 may include one or more modules that facilitate the interaction between processing component 314 and other components. For instance, processing component 314 may include a communication module to facilitate the interaction between communication component 324 and processing component 314.

In exemplary embodiments, processing component 314 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the disclosed traffic-counting methods.

Memory 318 may be configured to store various types of data to support the operation of imaging device 310. Examples of such data include instructions for any applications or methods performed by imaging device 310, image data generated by image sensor 312, traffic-counting results, etc. Memory 318 may be implemented using any type of volatile or non-volatile memory devices, or a combination thereof, such as a memory chip (or integrated circuit), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

In exemplary embodiments, there is also provided a non-transitory computer-readable storage medium including instructions, such as included in memory 318, executable by processor 316, for performing the disclosed traffic-counting methods.

Power component 320 may provide power to various components of imaging device 310. Power component 320 may include a power management system, one or more power sources, and any other components associated with the generation, management, and distribution of operating power in imaging device 310.

Multimedia component 322 may include a screen providing an output interface between imaging device 310 and the user. For example, the screen may be used to display the captured images and provide image preview. In some embodiments, the screen may include a liquid crystal display (LCD) and a touch panel (TP). If the screen includes the touch panel, the screen may receive touch input signals from the user. The touch panel includes one or more touch sensors to sense touches, swipes, gestures, and other tactile inputs. In some embodiments, multimedia components 322 may include a microphone configured to receive external audio signals while imaging device 310 is capturing images. The received audio signal may be further stored in memory 318 or transmitted via communication component 324. In some embodiments, multimedia components 322 may further include a speaker to output audio signals.

Communication component 324 may be configured to facilitate communication, wired or wirelessly, between the imaging device 310 and other devices, e.g., server 350. Imaging device 310 may access a wireless network based on one or more communication standard, such as Wi-Fi, LTE, 2G, 3G, 4G, 5G, etc. In one exemplary embodiment, communication component 324 may receive or send broadcast signals and associated information via a broadcast channel. In one exemplary embodiment, communication component 324 may further include a NFC module to facilitate short-range communications. In other embodiments, communication component 324 may be implemented based on a radio frequency identification (RFID) technology, an infrared data association (IrDA) technology, an ultra-wideband (UWB) technology, a Bluetooth technology, or other technologies.

I/O interface 326 may provide an interface between processing component 312 and peripheral interface modules, such as a keyboard, a click wheel, buttons, touch screens, and the like.

Imaging device 310 may transmit the traffic-counting result and/or the image data, via communication component 324, to server 350 for further analysis. Server 150 may be a general purpose computer, a mainframe computer, a server cluster consisting of a plurality of servers, a cloud-based computing service, or any combination of these components. Server 350 may further analyze the traffic-counting result and generate various recommendations tailored to the user's practical needs.

As described below, the disclosed embodiments provide computer vision-based methods for counting moving objects and determining the moving directions of the moving objects. The disclosed methods may be implemented with devices having a limited processing capability and thus are suitable to be implemented in an embedded system. Specifically, the disclosed methods identify multiple regions of interests (ROIs) in an image of movement area 120. The disclosed methods then subtract the image background from the ROIs to determine whether the ROIs contain moving objects. The disclosed methods also constantly update the image background to improve the accuracy of image segmentation (i.e., separation of foregrounds or objects from the background). Moreover, the disclosed methods include workflows to count and determine moving directions of objects 110 based on analysis of one or more properties of the multiple ROIs.

Figure 4:
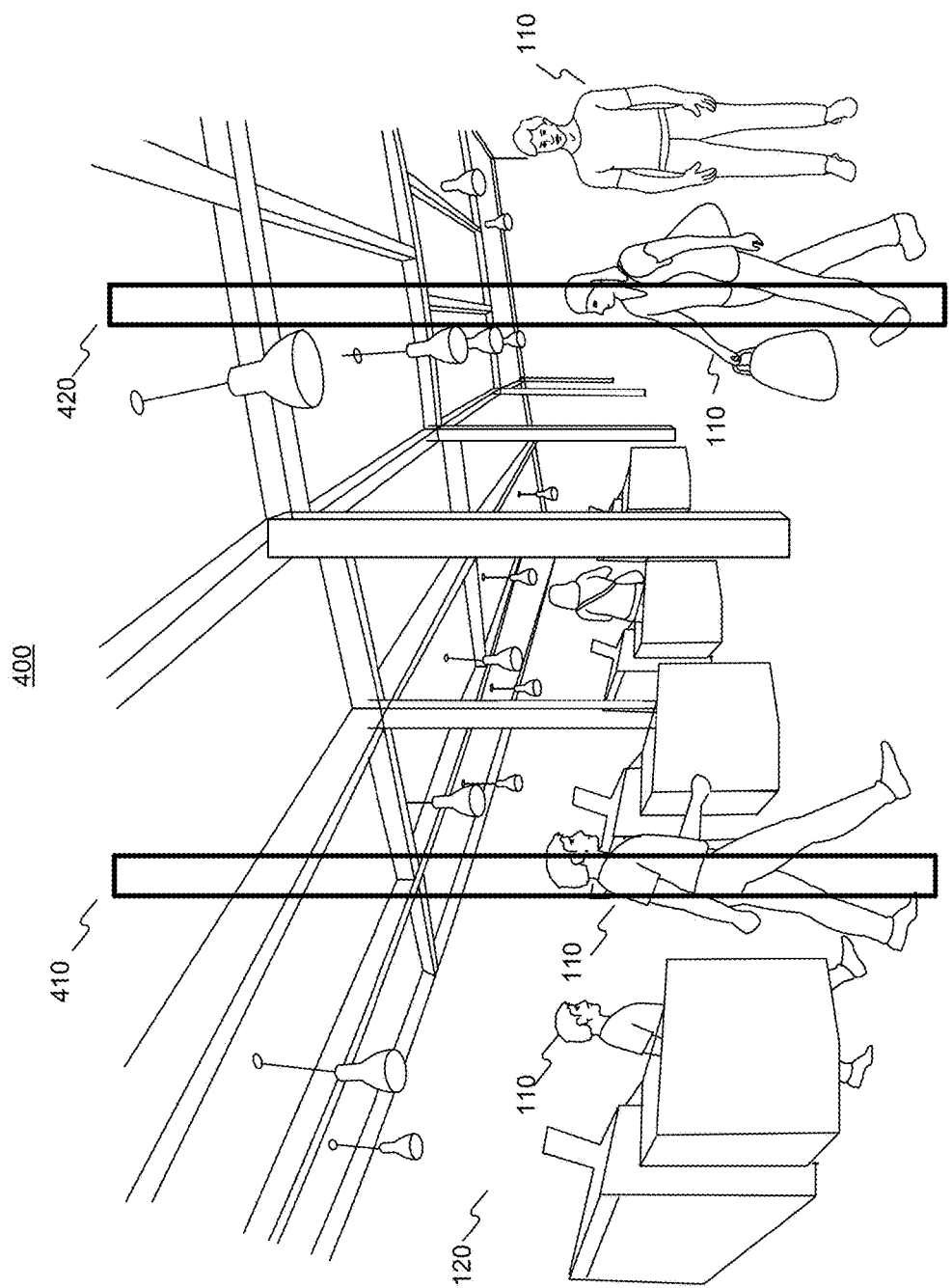
FIG. 4 is a schematic diagram illustrating two regions of interest (ROIs) in an image frame, according to an exemplary embodiment.

Without loss of generality, the follow description uses two ROIs in an image frame to illustrate the disclosed traffic-counting methods. However, it is contemplated that more than two ROIs may also be used. FIG. 4 is a schematic diagram illustrating two ROIs in an image frame, according to an exemplary embodiment. Referring to FIG. 4, image frame 400 shows a view of movement area 120, where multiple objects 110 are moving. Two ROIs, 410 and 420, may be identified in image frame 400 and correspond to different portions of movement area 120.

Without loss of generality, movement area 120 is assumed to be the entrance of a store. The direction from ROI 410 to ROI 420 corresponds to the direction of entering the store.

When a visitor enters the store, the visitor may first appear in ROI 410 and then appear in ROI 420. Conversely, when the visitor leaves the store, the visitor may first appear in ROI 420 and then appear in ROI 410. That is, people first appearing in ROI 410 may be considered to be moving into the store, and people first appearing in ROI 420 may be considered to be moving out of the store. Thus, ROIs 410 and 420 are also referred to herein as "ROI_In" and "ROI_Out", respectively. By analyzing and comparing image data representing ROIs 410 and 420 over time, people entering and leaving the store may be counted respectively.

ROIs 410 and 420 may have any desired shapes and sizes. For example, as shown in FIG. 4, each of ROIs 410 and 420 may be a rectangular box with a height equal to the height of image frame 400. Moreover, the sizes of the ROIs may be adjusted based on the volume of the traffic. For example, when movement area 120 becomes crowded, imaging device 310 may reduce the widths of ROIs 410 and 420, so as to minimize the problem of occlusion.

An image representing an ROI may include a background and a foreground. The background is the background scene of the ROI, which includes no moving objects. The foreground may relate to one or more moving objects in the ROI. To detect a moving object in the ROI, imaging device 310 needs to separate the foreground from the background. Therefore, before performing the traffic counting, imaging device 310 needs to determine the background of the ROI.

Figure 5:
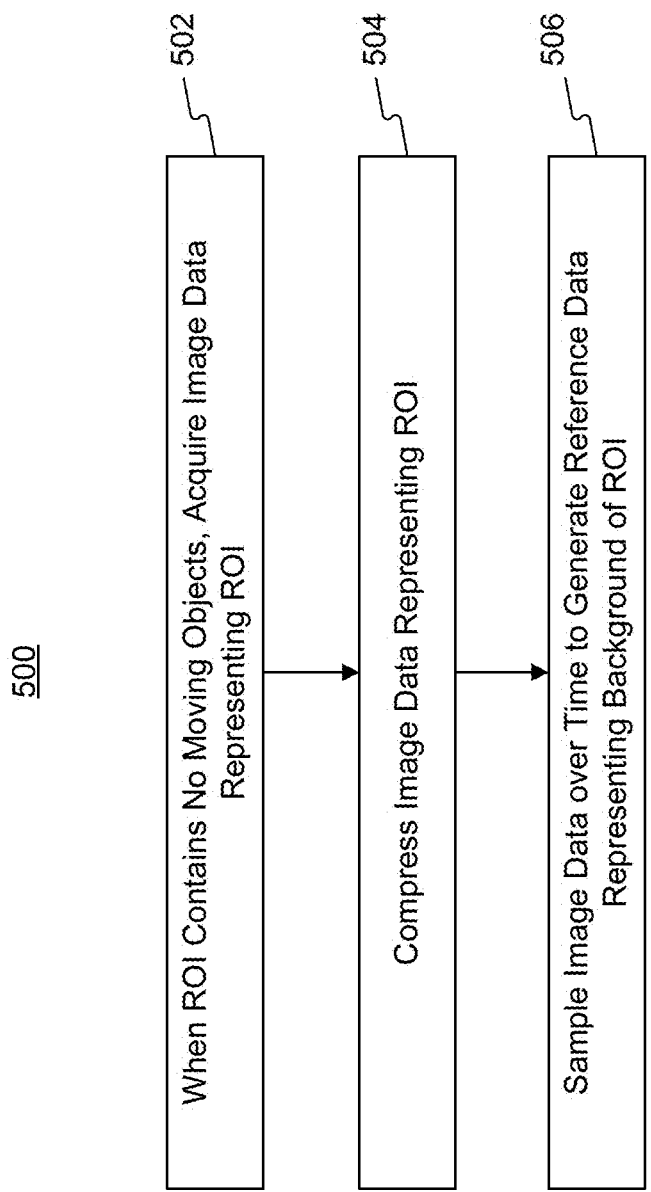
FIG. 5 is a flowchart of a method for generating reference data representing a background of an ROI, according to an exemplary embodiment.

FIG. 5 is a flowchart of a method 500 for generating reference data representing a background of an ROI, according to an exemplary embodiment. In the following description, "reference data" and "background" will be used interchangeably. Method 500, for example, may be performed by imaging device 310. Referring to FIG. 5, method 500 may include the following steps 502-506.

In step 502, when the ROI contains no moving objects, imaging device 310 acquires image data representing the ROI. For example, during a time when no objects 110 move in the ROI, imaging device 310 may acquire, through image sensor 310, one or more frames of image data representing a view of movement area 120. Each frame contains a plurality of pixels, and each pixel has one or more pixel values indicating certain attributes of the pixel, such as luminance (i.e., brightness) and chrominance (i.e., color) of the pixel. In each frame, imaging device 310 may identify the region that corresponds to the ROI.

In step 504, imaging device 310 compresses the image data representing the ROI. To reduce the computational load, imaging device 310 may use any suitable method to compress the image data, such as the method shown in FIG. 6, which is a schematic diagram illustrating a process for compressing image data representing an ROI, according to an exemplary embodiment.

Figure 6:
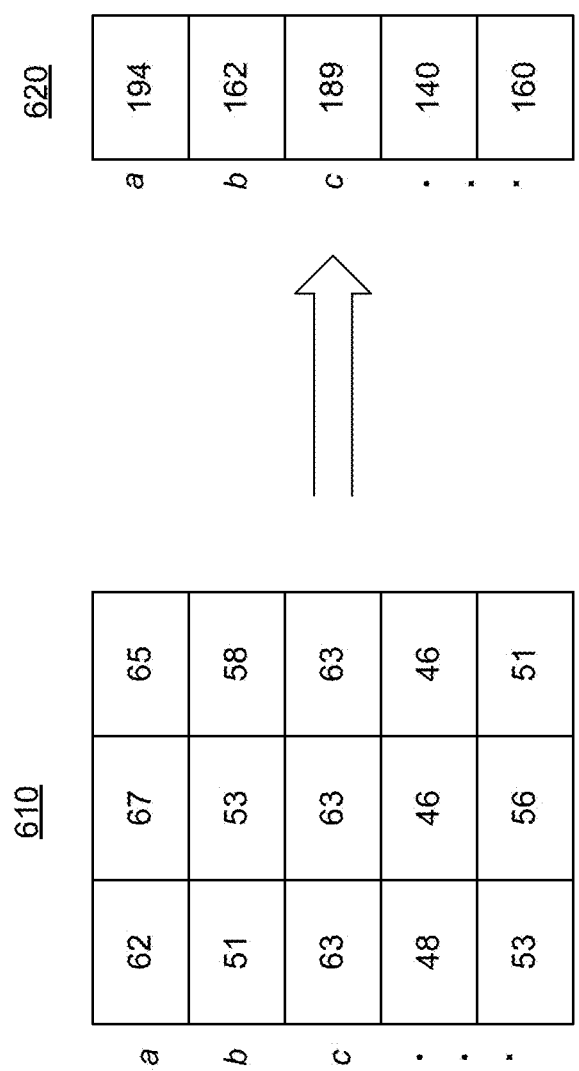
FIG. 6 is a schematic diagram illustrating a process for compressing image data representing an ROI, according to an exemplary embodiment.

Referring to FIG. 6, image data 610 may be extracted from an image frame of movement area 120 and includes the pixel values of the pixels corresponding to the ROI. The pixel values used for generating the background of the ROI may be greyscale values, with the lowest possible pixel value being 0 (black), and the maximum possible pixel value being 255 (white). The greyscale values indicate the luminance in the ROI. As illustrated in FIG. 6, if the ROI is a rectangular box, image data 610 may be expressed as a matrix including the greyscale values of the ROI, with the number in each small square representing the pixel value (i.e., greyscale value) of the corresponding pixel.

Image data 610 may include multiple rows, labeled a, b, c, . . . , with the total number of the rows equal to the image height of the frame of movement area 120. Imaging device 310 may add up the pixel values in each row of image data 610 (i.e., matrix 610), to generate compressed image data 620. Thus, compressed image data 620 may be expressed as a one-dimensional array, the size of the array being equal to the image height of the frame of movement area 120. The pixel value in each row of the compressed image data 620 is the sum of the pixel values in the corresponding row of image data 610. For example, with continued reference to FIG. 6, imaging device 310 may add up the pixel values in row a of image data 610 to generate the pixel value in row a of compressed image data 620.

In practice, compression of image data (step 504) may be optional. Accordingly, the term "image data" used in the following description may refer to either uncompressed or compressed image data. Unless in places where the data compression is critical to the implementation of the disclosed methods, the following description does not distinguish the uncompressed image data from the compressed image data.

In step 506, imaging device 310 samples the image data over time to generate reference data representing the background of the ROI. To reduce data noise, imaging device 310 may use any suitable method to generate the reference data based on image data obtained over a period of time. For example, imaging device 310 may average the image data (i.e., computing the arithmetic mean of the image data) over time to obtain the reference data. For another example, imaging device 310 may apply a median filter to the image data obtained over time, so as to remove the data noise.

FIG. 7 is a schematic diagram illustrating a process for applying a median filter to the image data, according to an exemplary embodiment. The median filter takes the median of the pixel values of the corresponding pixels in a plurality of frames. The median pixel values may then be used to generate the reference data representing the background of the ROI. This way, the median filter may remove noise or extreme values from the image data.

Referring to FIG. 7, imaging device 310 may extract image data representing the ROI from multiple frames of movement area 120. For example, image data 721-723 are extracted from three different frames, and are respectively represented as three pixel arrays, with the numbers in the small squares representing the pixel values. The rows of the pixel arrays are labeled a, b, c, . . . . Imaging device 310 processes the pixel values of image data 721-723 and constructs a pixel array that constitutes reference data 730, also represented as a pixel array with the same dimension (i.e., size) as image data 721-723.

Specifically, for row $a_m$ of reference data 730, imaging device 310 calculates a pixel value equal to the median of corresponding pixels of image data 721-723. For example, the pixel value of row $a_m$ of reference data 730 is 193, the median of 191, 194, and 193, which are the pixel values of corresponding rows $a_1$-$a_3$ of frames 721-723.

In exemplary embodiments, imaging device 310 may generate the reference data (i.e., background) dynamically, in order to reflect real-time changes to the background of ROI. That is, after the reference data is generated according to method 500, imaging device 310 may update the reference data constantly. For example, when imaging device 310 is installed at an entrance/exit of a store, the lighting condition in movement area 120 may constantly change, due to change of sunlight, turning on or off certain lights, etc. For another example, still objects, such as a table or chair, may be occasionally removed from or added into the background scene of the ROI. For yet another example, replacement of or hardware/software change associated with image sensor 312 may cause change of brightness in the generated images.

FIG. 8 is a flowchart of a method 800 for updating a background of an ROI, according to an exemplary embodiment. For example, method 800 may be performed by imaging device 310. Referring to FIG. 8, method 800 may include the following steps.

In step 802, imaging device 310 acquires current image data representing the ROI. For example, imaging device 310 may acquire, through image sensor 312, the current frame of movement area 120. Imaging device 310 may then extract the current image data representing the ROI from the current frame.

In step 804, imaging device 310 compresses the current image data. Step 804 is similar to step 504 (FIG. 5).

In step 806, imaging device 310 determines whether a difference between the current image data and the reference data exceeds a predetermined data threshold.

Before using the current image data to update the reference data, imaging device 310 needs to ascertain there are no moving objects in the ROI while the current image data is taken. Specifically, imaging device 910 may subtract the reference data from the current image data to obtain the difference between the current image data and the reference data. When the difference does not exceed the predetermined data threshold, imaging device 310 may determine the ROI does not contain a foreground and thus contains no moving objects. Accordingly, imaging device 310 may proceed to step 810. Conversely, when the difference exceeds the predetermined data threshold, imaging device 310 may determine that the ROI contains a foreground. The detection of a foreground suggests that there may be moving objects in the ROI. Accordingly, imaging device 310 may proceed to step 808.

Imaging device 310 may use various methods to detect a foreground. In one embodiment, imaging device 310 may compute the absolute value differences between the pixel values in the current image data and the corresponding pixel values in the reference data. Imaging device 310 may then compare the absolute value differences with a predetermined pixel-value threshold. When more than a predetermined percentage of the total pixels in the current image data differ from the reference data by more than the predetermined pixel-value threshold, imaging device 310 may determine that the ROI contains a foreground.

Figures 9A, 9B:
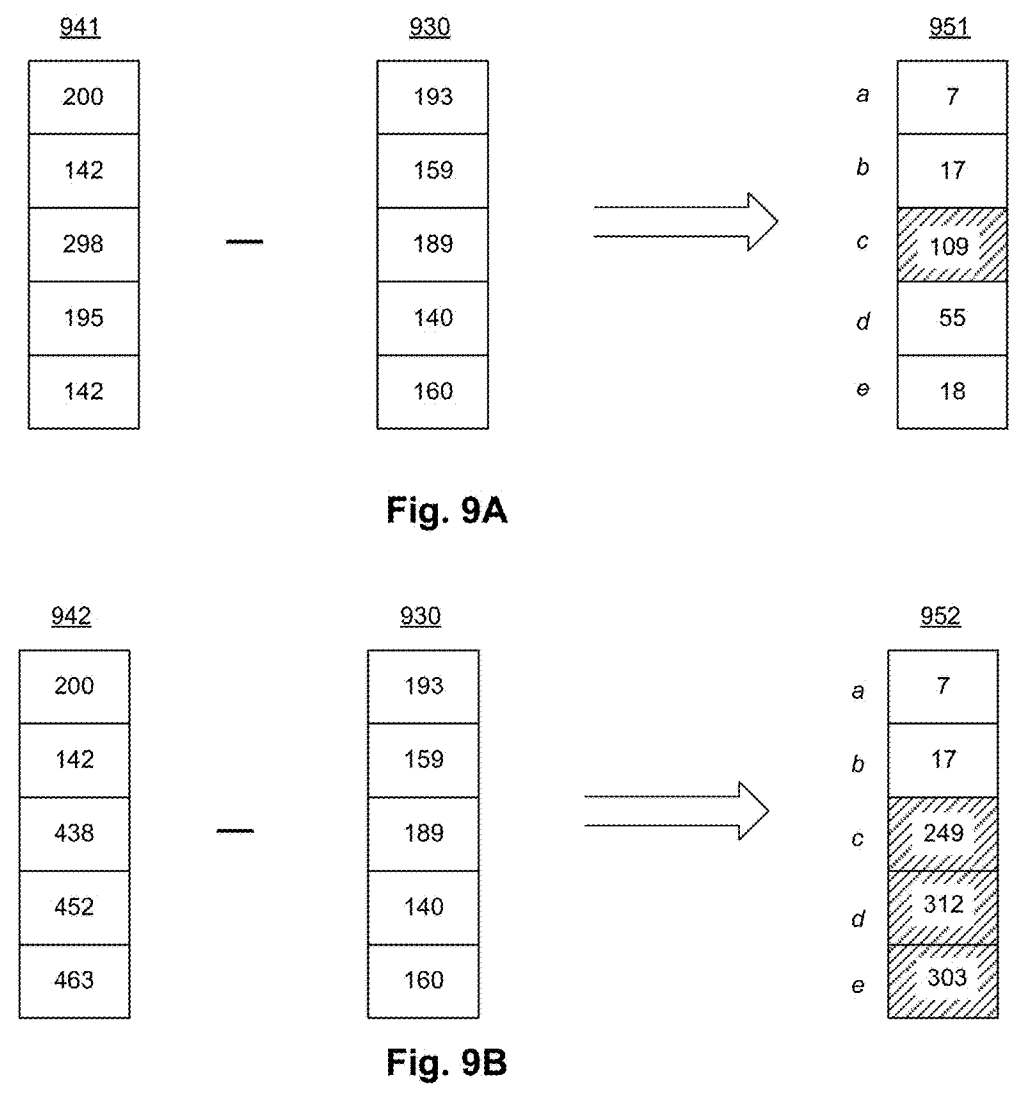

FIGS. 9A and 9B are schematic diagrams illustrating a process for detecting a foreground in an ROI, according to an exemplary embodiment. Referring to FIG. 9A, reference data 930 and current image data 941 are two 5×1 arrays representing the ROI. Imaging device 310 may subtract reference data 930 from current image data 941 to generate background-subtracted data 951, which contains the absolute value differences between current image data 941 and reference data 930. Imaging device 310 may compare the absolute value differences in background-subtracted data 951 with a predetermined pixel-value threshold, e.g., 100. Only one absolute value difference, namely, 109 at row c, of background-subtracted data 951 is above the predetermined pixel-value threshold. Thus, 20% (i.e., one out of five) of the total pixels in current image data 941 differ from reference data 930 by more than the predetermined pixel-value threshold. Imaging device 310 may further compare 20% with a predetermined percentage, e.g., 40%. Since 20%<40%, imaging device 310 may determine that the difference between current image data 941 and reference data 930 does not exceed the predetermined data threshold and the ROI contains no foreground.

Referring to FIG. 9B, current image data 942 is obtained at a point in time different from current image data 941. Imaging device 910 may subtract reference data 930 from current image data 942 to generate background-subtracted data 952. Three absolute value differences, namely, 249, 312, and 303 at row c, d, and e respectively, of background-subtracted data 952 are above the predetermined pixel-value threshold (i.e., 100). Thus, 60% (i.e., three out of five) of the total pixels in current image data 942 differs from reference data 930 by more than the predetermined pixel-value threshold. Since 60% is above the predetermined percentage of 40%, imaging device 310 may determine that the difference between current image data 942 and reference data 930 exceeds the predetermined data threshold and the ROI contains a foreground. As illustrated by FIGS. 9A and 9B, the use of the predetermined pixel-value threshold and predetermined percentage of pixels can prevent data noises being treated as foreground. For example, the absolute value difference "109" in background-subtracted data 951, although above the predetermined pixel-value threshold "100", likely corresponds to data noise, not a foreground.

With continued reference to FIG. 8, when no foreground is detected in step 806 (i.e., the difference between the current image data and the reference data does not exceed the predetermined data threshold), imaging device 310 may conclude that no moving objects are present in the ROI while the current image data is acquired. Accordingly, imaging device 310 may proceed to step 810 and update the reference data based on the current image data.

In step 810, imaging device 310 may use various methods to update the reference data. In one embodiment, imaging device 310 may replace the reference data with the current image data. In another embodiment, imaging device 310 may average the existing reference data and the current image data to generate updated reference data. In yet another embodiment, similar to the median filter described in step 506, imaging device 310 may apply a median filter to the current image data and image data extracted from other frames, and use the filtered data to generate the updated reference data.

With continued reference to FIG. 8, when a foreground is detected in step 806 (i.e., the difference between the current image data and the reference data exceeds the predetermined data threshold), imaging device 310 may proceed to step 808 to examine whether the difference uninterruptedly exceeds the predetermined data threshold for longer than a predetermined amount of time, e.g., five minutes. In other words, imaging device 310 may examine whether the foreground can be continuously detected in more than a predetermined number of consecutive frames.

The purpose of step 808 is to determine whether the foreground detected in the current image data foreground corresponds to moving objects in the ROI or merely background change in the ROI. If the difference intermittently exceeds the predetermined data threshold, this may be due to objects 110 periodically passing the ROI. Accordingly, imaging device 310 may conclude that the foreground in the current image data corresponds to moving objects, and thus the current image data should not be used to update the reference data. Conversely, if the difference uninterruptedly stays above the predetermined data threshold for longer than a predetermined amount of time, this may be due to the environment (e.g., lighting) change in the ROI or change/replacement of image sensor 312. In this situation, the foreground detected in the current image data more likely corresponds to the background change, and less likely corresponds to moving objects. Therefore, imaging device 310 may use the current image data to update the reference data.

Still referring to FIG. 8, when determining that the difference between the current image data and the reference data uninterruptedly exceeds the predetermined data threshold for longer than a predetermined amount of time (i.e., for more than a predetermined number of consecutive frames), imaging device 310 may proceed to step 810 and update the reference data based on the current image data. Since in this case the background of the ROI (e.g., lighting or image sensor 312) has changed, imaging device 310 may discard the existing reference data. Further, similar to step 506 (FIG. 5), imaging device 310 may sample the current image data over time (e.g., applying median filter) to generate new reference data.

When the reference data is generated and updated according to methods 500 and 800 respectively, imaging device 310 can robustly separate the foreground of an ROI from the background of an ROI. Referring to FIG. 4, by analyzing and comparing properties of the foregrounds of ROI_IN 410 and ROI_OUT 420 over time, imaging device 310 may count the moving objects 110 moving between ROI_In 410 and ROI_Out 420 and determine the moving directions of objects 110.

Figure 10:
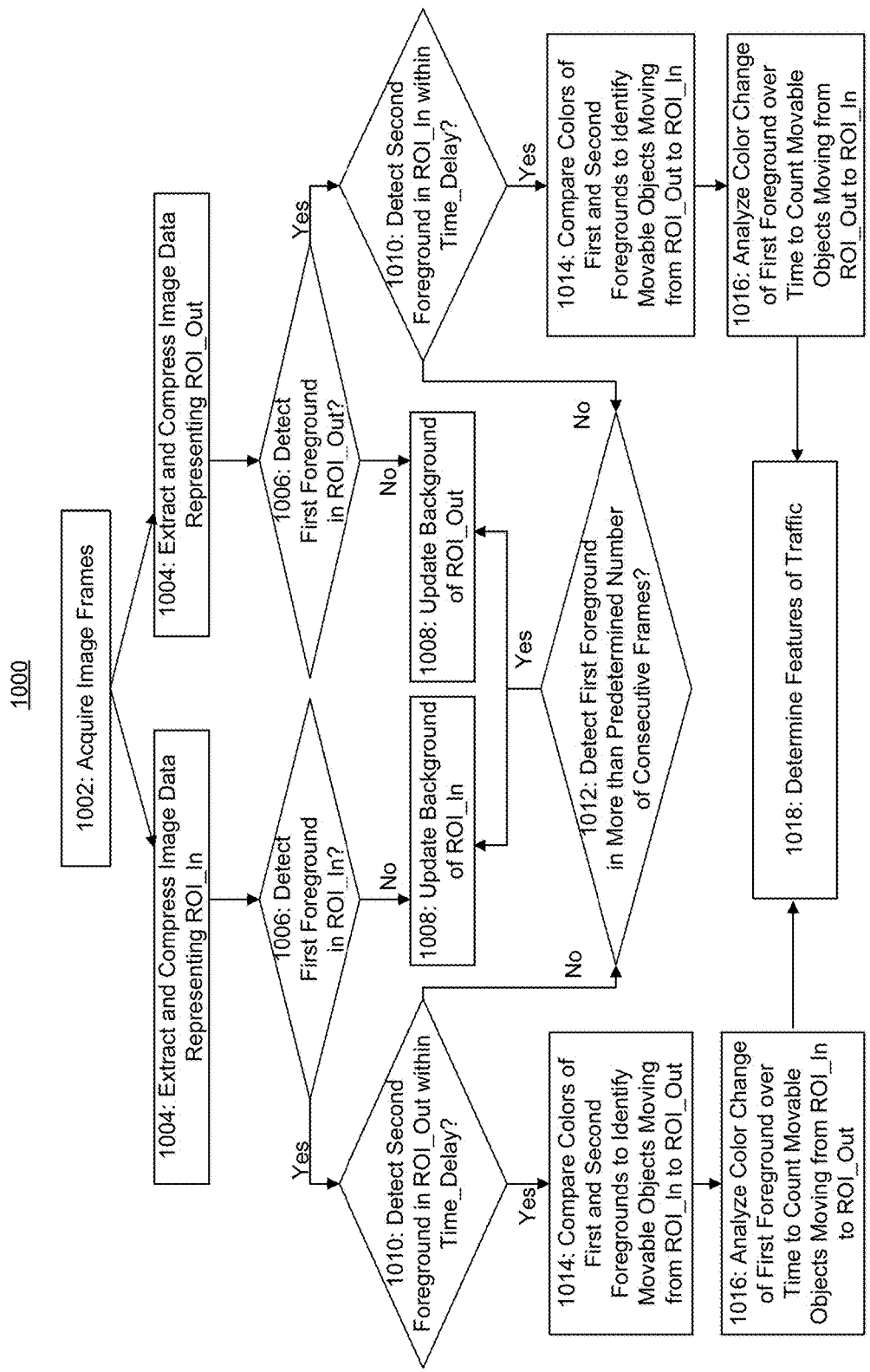
FIG. 10 is a flowchart of a traffic-counting method, according to an exemplary embodiment.

FIG. 10 is a flowchart of a traffic-counting method 1000, according to an exemplary embodiment. For example, method 1000 may be performed by imaging device 310 installed at the entrance/exit area of a store, so as to count the people (i.e., objects 110) entering and leaving the store. For illustrative purpose only, method 1000 will be described in conjunction with ROI_In 410 and ROI_Out 420 (FIG. 4). However, it is contemplated that method 1000 may be applied to more than two ROIs. Referring to FIG. 10, method 1000 may include the following steps 1002-1018.

In step 1002, imaging device 310 acquires, via image sensor 312, image data of frames showing a view of movement area 120. Data of each image frame is composed of a plurality of pixels. Each pixel has one or more pixel values indicating certain attributes of the pixel, such as brightness and color of the pixel. For example, the image frames may be in RGB format. That is, each pixel may have three color values corresponding to red, green, and blue, respectively. Imaging device 310 may transform the image frames into grayscale images by averaging the three color values of each pixel.

In step 1004, imaging device 310 extracts from the acquired frames the image data representing ROI_In 410 and ROI_Out 420 respectively. As describe above, for example, the image data representing each ROI may be expressed as a matrix including the greyscale values of the ROI. The total number of rows in each matrix is equal to the total number of rows (i.e., image height) in the acquired frame. Similar to step 504 (FIG. 5), imaging device may further compress each matrix by adding up the greyscale values in each row of the matrix. Thus, the compressed image data representing each ROI may be expressed as an array.

For illustrative purpose only, the following description about steps 1006 uses the case of objects 110 moving from ROI_In 410 to ROI_Out 420 as an example (i.e., the left side of the flowchart shown in FIG. 10). It is contemplated that the following description equally applies to the case where objects 110 move from ROI_Out 420 to ROI_In 410 (i.e., the right side of the flowchart shown in FIG. 10).

In step 1006, imaging device 310 analyzes a current image frame to determine whether a first foreground begins to appear in ROI_In 410. Similar to step 806 (FIG. 8), imaging device 310 may compute the difference between the current image data representing ROI_In 410 and the background of ROI_In 410. When more than a predetermined percentage of pixels in the current image data differ from the background by more than a predetermined pixel-value threshold, imaging device 310 may determine that ROI_In 410 contains a foreground. If the current image data indicates the first foreground begins to appear in ROI_In 410, imaging device 310 proceeds to step 1010. Otherwise, imaging device 310 proceeds to step 1008.

When no foreground is detected in the current image data representing ROI_In 410, imaging device 310 may conclude that no objects 110 are passing ROI_In 410. Accordingly, imaging device 310 may perform step 1008 and use the current image data to update the background of ROI_In 410. The implementation of step 1008 is similar to step 810 (FIG. 8).

When the first foreground is detected in the current image data representing ROI_In 410, imaging device 310 may determine that the first foreground is composed of the pixels differing from the background by more than the predetermined pixel-value threshold. Imaging device 310 may further save the positions (i.e., the row numbers in the compressed image data) of these pixels in an array variable "Position_In[ ]," so as to record the location of the first foreground in ROI_In 410. Imaging device 310 may also use a variable "T_In" to record the point in time when the first foreground begins to appear.

When an object 110 moves from ROI_In 410 to ROI_Out 420, the object 110 appears in ROI_In 410 and ROI_Out 420 sequentially in time. Imaging device 310 may use a variable "Time_Delay" to store the maximum time duration needed by an object 110 to move from ROI_In 410 to ROI_Out 420, or vice versa. Imaging device 310 may determine Time_Delay based on the distance separating ROI_In 410 and ROI_Out 420. That is, Time_Delay is proportional to the distance. For example, imaging device 310 may divide the distance by the slowest possible moving speed of objects 110 to obtain Time_Delay.

In step 1010, imaging device 310 determines whether a second foreground begins to appear in ROI_Out 420 within Time_Delay after T_In. Specifically, imaging device 310 may monitor ROI_Out 420 after T_In to determine whether ROI_Out 420 contains a foreground. The process for detecting a foreground in ROI_Out 420 is similar to step 1006. When a new foreground, i.e., the second foreground, is detected in ROI_Out 420, imaging device 310 may record the point in time in a variable "T_Out." Imaging device 310 may then compare (T_Out-T_In) with Time_Delay. If (T_Out-T_In)>Time_Delay, imaging device 310 may determine that no foreground is detected in ROI_Out 420 within Time_Delay and proceed to step 1012. If (T_Out-T_In) ≤Time_Delay, imaging device 310 may determine that the second foreground begins to appear in ROI_OUT 420 within Time_Delay. Imaging device 310 may then save the positions of the pixels constituting the second foreground in an array variable "Position_Out[ ]" and proceed to step 1014.

In step 1012, imaging device 310 determines whether the first foreground is continuously detected in more than a predetermined number of consecutive frames. If the first foreground is continuously detected in more than the predetermined number of consecutive frames, imaging device 310 may conclude that the first foreground likely correspond to a background change in ROI_In 410. Accordingly, imaging device 310 may proceed to step 1008 and use the current image data to update the background of ROI_In 410. The implementation of steps 1012 is similar to step 808 (FIG. 8).

In step 1014, imaging device 310 compares the colors of the first and second foregrounds to identify objects 110 moving from ROI_In 410 to ROI_Out 420. After the second foreground is detected within Time_Delay, imaging device 310 needs to determine whether the first and second foregrounds correspond to the same objects 110 that are moving from ROI_In 410 to ROI_Out 420.

Specifically, imaging device 310 may use the variables "Color_In" and "Color_Out" to store color values corresponding to the first and second foregrounds respectively. While the first and second foregrounds are detected respectively, imaging device 310 may keep sampling the color values of the pixels recorded in Position_In[ ] and Position_Out[ ], and save the sampled color values in Color_In and Color_Out. Imaging device 310 may then compare the difference between Color_In and Color_Out. When the difference is below a predetermined color threshold, imaging device 310 may determine that the colors of the first and second foregrounds are consistent.

In one embodiment, imaging device 310 may compare Color_In sampled at T_In with Color_Out sampled at T_Out. When the comparison indicates that the color of the first foreground at T_In and the color of the second foreground at T_Out are consistent, imaging device 310 may conclude that the first and second foregrounds correspond to the same objects 110 moving from ROI_In 410 to ROI_Out 420. Otherwise, imaging device 310 may conclude that the first and second foregrounds are unrelated. The color inconsistence suggests that the second foreground may correspond to objects 110 moving from ROI_Out 420 to ROI_In 410, or may correspond to a background change in ROI_Out 420.

In practice, a group of objects 110 moving together may show as one foreground in ROI_In 410 and/or ROI_Out 420. For example, a family visiting a store may walk in a close group and there are no clear spatial separations among the family members. When passing ROI_In 410 and/or ROI_Out 420, the family may appear continuously over time as one foreground, instead of multiple discrete foregrounds over time. Therefore, to ensure the accuracy of traffic counting, imaging device 310 needs to further resolve the number of objects 110 represented by the first foreground and/or second foreground.

In step 1016, imaging device 310 analyzes the color change of the first foreground to count the number of objects 110 represented by the first foreground. Specifically, imaging device 310 may monitor Color_In over time while the first foreground is detected. If the change of Color_In is below the predetermined color threshold, imaging device 310 may determine that the color of the first foreground does not change. Conversely, if Color-In changes by more than the predetermined color threshold, imaging device 310 may determine that the color of the first foreground has changed.

In one embodiment, when the color of the first foreground is unchanged, imaging device 310 may conclude that the first foreground correspond to an object 110 moving from ROI_In 410 to ROI_Out 420. However, when the color of the first foreground changes N times and N is a positive integer, imaging device 310 may conclude that the first foreground correspond to (N+1) objects 110 moving from ROI_In 410 to ROI_Out 420, and these (N+1) objects 110 are moving in a group without clear separation in space.

Imaging device 310 may use variable "Num_In" to record the accumulated number of objects 110 moving from ROI_In 410 to ROI_Out 420. Similarly, imaging device 310 may use variable "Num_Out" to record the accumulated number of objects 110 moving from ROI_Out 420 to ROI_In 410. For example, after determining the number of objects 110 represented by the first foreground, imaging device 310 may add this number to Num_In, so as to track the total number of objects moving from ROI_In 410 to ROI_Out 420 during a specified period of time.

Moreover, after counting the number of objects 110 represented by the first foreground, imaging device 310 may reset T_In, T_Out, Color_In, and Color_Out to default values (e.g., zero), so that these variables can be used for analyzing the next foreground that will be detected in ROI_In 410.

In step 1018, imaging device 310 determines one or more features of the traffic formed by objects 110. For example, if the direction from ROI_In 410 to ROI_Out 420 corresponds to the direction of entering the store, imaging device 310 may determine, based on Num_In, the number of people entering a store during a specified period of time.

In the above example, because imaging device 310 may be installed at different locations and have different orientations relative to the traffic directions, the direction from ROI_In 410 to ROI_Out 420 does not always correspond to the direction of entering the store. In practice, the direction of entering the store may be preset by a user or automatically determined by imaging device 310.

FIG. 11 is a flowchart of a method 1100 for identifying a moving direction toward a place of interest, according to an exemplary embodiment. For example, the place of interest may be a store and method 1100 may be performed by imaging device 1100 to automatically determine the direction of entering the store. Referring to FIG. 11, method 1100 may include the following steps 1102-1106.

In step 1102, imaging device 310 determines whether the direction of entering the store is known. If the direction is known, imaging device 310 may proceed to step 1106. Otherwise, imaging device 310 may proceed to step 1104.

In step 1104, imaging device 310 determines the direction of entering the store. For example, each day after midnight, imaging device 310 may reset Num_In and Num_Out to zero, and start to count the number of people moving from ROI_In 410 to ROI_Out 420 and the number of people moving from ROI_Out 420 to ROI_In 410. Imaging device 310 may then determine which of Num_In and Num_Out first reaches a predetermined number, e.g., 400. Since visitors of the store must first enter the store and then leave the store, the direction first reaching the predetermined number is the direction of entering the store. For example, if Num_In reaches 400 earlier than Num_Out, imaging device 310 may determine that the direction from ROI_In 410 to ROI_Out 420 corresponds to the direction of entering the store. This way, imaging device 310 can automatically identify the direction of entering the store, sparing the user the trouble of manually setting the direction.

In step 1106, imaging device 310 determines and outputs the number of people entering the store. Referring to the above example, imaging device 310 may output Num_In as the number of people entering the store.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention should only be limited by the appended claims.

What is claimed is:

1. A traffic-counting method performed by a processor in communication with an imaging device, comprising:
   in a view of traffic comprising moving objects, identifying first and second regions of interest (ROIs);
   obtaining, from the imaging device, first and second image data respectively representing the first and second ROIs;
   analyzing the first and second image data over time; and
   based on the analyses of the first and second image data:
      counting the moving objects; and
      determining moving directions of the moving objects, wherein the counting and determining comprise:
         detecting that a first foreground begins to appear in the first ROI:
         when detecting that a second foreground begins to appear in the second ROI within a first amount of time after the first foreground begins to appear, determining whether a color of the first foreground is consistent with a color of the second foreground; and
         when it is determined that the colors of the first and second foregrounds are consistent, concluding that one or more moving objects are moving from the first ROI to the second ROI.

2. The method of claim 1, wherein the first and second ROIs correspond to different portions of an area where the traffic occurs.

3. The method of claim 1, wherein identifying the first and second ROIs further comprises:
   setting sizes of the first and second ROIs based on volume of the traffic.

4. The method of claim 1, wherein:
   the analyzing comprises comparing, over time, a value of a property of the first ROI with a value of the property of the second ROI; and
   the counting and determining comprise counting the moving objects and determining the moving directions of the moving objects, based on a result of the comparison.

5. The method of claim 4, wherein the property comprises at least one of:
   a brightness of the respective ROI; or
   a color of the respective ROI.

6. The method of claim 1, further comprising:
   when detecting that the color of the first foreground changes N times, concluding that (N+1) moving objects are moving from the first ROI to the second ROI, N being an integer greater than or equal to zero.

7. The method of claim 1 further comprising:
   determining the first amount of time based on a distance separating the first and second ROIs.

8. The method of claim 1, wherein detecting the first foreground further comprises:
   obtaining reference data representing the first ROI in a time when no moving objects are present in the first ROI;
   determining a difference between the first image data and the reference data; and
   when the difference exceeds a predetermined data threshold, determining the difference as the first foreground.

9. The method of claim 8, further comprising:
   when the difference does not exceed the data threshold, updating the reference data based on the first image data.

10. The method of claim 8, further comprising:
    when determining that the first foreground has appeared for longer than a second amount of time, updating the reference data based on the first image data.

11. The method of claim 10, wherein:
    the first image data represents a plurality of image frames; and
    determining that the first foreground has appeared for longer than a second amount of time comprises:
       determining that a number of consecutive image frames containing the first foreground exceeds a predetermined number.

12. The method of claim 1, wherein determining that the colors of the first and second foregrounds are consistent comprises:
    determining a first color value indicative of the color of the first foreground when the first foreground begins to appear;
    determining a second color value indicative of the color of the second foreground when the second foreground begins to appear; and
    when determining that the first and second color values differ by less than a predetermined color threshold, determining that the colors of the first and second foregrounds are consistent.

13. The method of claim 1, wherein counting the moving objects and determining moving directions of the moving objects comprise:
    determining a feature of the traffic based on a result of the counting and the determined moving directions.

14. The method of claim 13, wherein:
    the traffic occurs on a pathway towards a place of interest; and
    determining the feature of the traffic comprises:
       counting, after a predetermined point in time, a first number of moving objects moving in a first direction and a second number of moving objects moving in a second direction; and
       when the first number reaches a predetermined value earlier than the second number, determining that the moving objects moving in the first direction are moving toward the place of interest.

15. A traffic-counting device, comprising:
    a memory storing instructions; and
    a processor in communication with an imaging device, the processor being configured to execute the instructions to:
       in a view of traffic comprising moving objects, identify first and second regions of interest (ROIs);
       obtain, from the imaging device, first and second image data respectively representing the first and second ROIs;
       analyze the first and second image data over time; and
       based on the analyses of the first and second image data:
          count the moving objects; and
          determine moving directions of the moving objects, wherein in counting the moving objects and determining the moving directions of the moving objects, the processor is further configured to execute the instructions to:
    determine that a first foreground begins to appear in the first ROI:
    determine whether a second foreground begins to appear in the second ROI within a first amount of time after the first foreground begins to appear;
    when the second foreground begins to appear within the first amount of time, determine whether a color of the first foreground is consistent with a color of the second foreground; and
    when the colors of the first and second foregrounds are consistent, conclude that one or more moving objects are moving from the first ROI to the second ROI.

16. The device of claim 15, wherein the first and second ROIs correspond to different portions of an area where the traffic occurs.

17. The device of claim 15, wherein the processor is further configured to execute the instructions to:
    set sizes of the first and second ROIs based on volume of the traffic.

18. The device of claim 15, wherein the processor is further configured to execute the instructions to:
    determine whether the color of the first foreground changes; and
    when determining that the color of the first foreground changes N times, conclude that (N+1) moving objects are moving from the first ROI to the second ROI, N being an integer greater than or equal to zero.

19. The device of claim 15, wherein the processor is further configured to execute the instructions to:
    determine the first amount of time based on a distance separating the first and second ROIs.

20. The device of claim 15, wherein the processor is further configured to execute the instructions to:
    obtain reference data representing the first ROI in a time when no moving objects are present in the first ROI;
    determine a difference between the first image data and the reference data; and
    when the difference exceeds a predetermined data threshold, determine the difference as the first foreground.

21. The device of claim 20, wherein the processor is further configured to execute the instructions to:
    when the difference does not exceed the data threshold, update the reference data based on the first image data.

22. The device of claim 20, wherein the processor is further configured to execute the instructions to:
    determine whether the first foreground appears for longer than a second amount of time;
    when the first foreground appears for longer than the second amount of time, update the reference data based on the first image data.

23. The device of claim 15, wherein the processor is further configured to execute the instructions to:
    determine a first color value indicative of the color of the first foreground when the first foreground begins to appear;
    determine a second color value indicative of the color of the second foreground when the second foreground begins to appear;
    compare the first and second color values; and
    when a difference of the first and second color values is less than a predetermined color threshold, determine that the colors of the first and second foregrounds are consistent.

24. The device of claim 15, wherein the processor is further configured to execute the instructions to:
    determine a feature of the traffic based on a result of the counting and the determined moving directions.

25. A non-transitory computer-readable storage medium storing instructions that, when executed by a processor of a device in communication with an imaging device, cause the device to perform a traffic-counting method, the method comprising:
    in a view of traffic comprising moving objects, identifying first and second regions of interest (ROIs);
    obtaining, from the imaging device, first and second image data respectively representing the first and second ROIs;
    analyzing the first and second image data over time; and
    based on the analyses of the first and second image data:
        counting the moving objects; and
        determining moving directions of the moving objects,
        wherein the counting and determining comprise:
            detecting that a first foreground begins to appear in the first ROI;
            when detecting that a second foreground begins to appear in the second ROI within a first amount of time after the first foreground begins to appear, determining whether a color of the first foreground is consistent with a color of the second foreground; and
            when it is determined that the colors of the first and second foregrounds are consistent, concluding that one or more moving objects are moving from the first ROI to the second ROI.

* * * * *